US006486270B1

(12) United States Patent
Garrison et al.

(10) Patent No.: US 6,486,270 B1
(45) Date of Patent: Nov. 26, 2002

(54) HIGH MOLECULAR WEIGHT, MEDIUM DENSITY POLYETHYLENE

(75) Inventors: Philip J. Garrison, Houston, TX (US); Lawrence R. Wallace, Bullard, TX (US); Danny L. Wise, Kings Mills, OH (US); James H. Meas, Jr., Cincinnati, OH (US); Leonard V. Cribbs, Hamilton, OH (US); Jean A. Merrick-Mack, West Chester, OH (US); Paula L. Nygard, Bay City, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/648,303

(22) Filed: Aug. 25, 2000

(51) Int. Cl.[7] .............................. C08F 2/04; C08F 2/34; C08L 23/06; C08L 23/08
(52) U.S. Cl. .......................... 526/65; 525/240; 526/90; 526/905; 526/348
(58) Field of Search .............................. 526/65; 525/240

(56) References Cited

U.S. PATENT DOCUMENTS

| 3,974,101 A | 8/1976 | Witt ........................... 252/458 |
| 4,357,448 A | 11/1982 | Tsubaki et al. ............... 526/65 |
| 4,464,518 A | 8/1984 | Iwabuchi et al. ............ 526/127 |
| 4,518,706 A | 5/1985 | Gessell ........................ 502/104 |
| 4,542,199 A | 9/1985 | Kaminsky et al. ........... 526/160 |
| 4,699,961 A | 10/1987 | Gessell ........................ 526/124 |
| 5,236,998 A | 8/1993 | Lundeen et al. ............... 525/52 |
| 5,539,124 A | 7/1996 | Etherton et al. ............. 548/402 |
| 5,589,539 A * | 12/1996 | Wagner et al. ................. 525/53 |
| 5,637,660 A | 6/1997 | Nagy et al. .................. 526/160 |
| 5,756,611 A | 5/1998 | Etherton et al. ............. 526/127 |
| 5,962,598 A | 10/1999 | Mack et al. ............. 525/333.8 |
| 6,034,027 A | 3/2000 | Krishnamurti et al. ....... 502/200 |
| 6,127,484 A | 10/2000 | Cribbs et al. ............... 525/191 |

FOREIGN PATENT DOCUMENTS

| EP | 0503791 A1 | 9/1992 |
| EP | 0529978 A1 | 3/1993 |
| EP | 0897934 A1 | 2/1999 |
| EP | 0905153 A1 | 3/1999 |
| WO | WO 94/22948 | 10/1994 |
| WO | WO 95/10548 | 4/1995 |
| WO | WO 98/52982 | 11/1998 |
| WO | WO 99/41310 | 8/1999 |
| WO | WO 99/58584 | 11/1999 |

* cited by examiner

*Primary Examiner*—David W. Wu
*Assistant Examiner*—R. Rabago
(74) *Attorney, Agent, or Firm*—Shao Guo

(57) ABSTRACT

A high molecular weight, medium density polyethylene (HMW, MDPE) is disclosed. The polyethylene comprises from about 85 to about 98 wt % of recurring units of ethylene and about 2 to about 15 wt % of a $C_3$–$C_{10}$ α-olefin. It has a density from about 0.92 to about 0.944 g/cc, a melt index $MI_2$ from about 0.01 to about 0.5 dg/min, and a melt flow ratio MFR from about 50 to about 300. It has a multimodal molecular weight distribution comprising a high molecular weight component and a low molecular weight component. The low molecular weight component has an $MI_2$ from about 50 to about 600 dg/min and a density from about 0.94 to about 0.97 g/cc. A process for making the medium density polyethylene is also disclosed. The process uses a Ziegler catalyst and applies multiple reaction zones.

10 Claims, No Drawings

HIGH MOLECULAR WEIGHT, MEDIUM DENSITY POLYETHYLENE

FIELD OF THE INVENTION

The invention relates to a high molecular weight, medium density polyethylene (HMW MDPE). More particularly, the invention relates to a HMW MDPE that is superior to existing high density polyethylene (HDPE), low density polyethylene (LDPE) and linear low density polyethylene (LLDPE). The invention also relates to a multiple zone ethylene polymerization process.

BACKGROUND OF THE INVENTION

Polyethylene is divided into high density (HDPE, density 0.941 g/cc or greater), medium density (MDPE, density from 0.926 to 0.940 g/cc), low density (LDPE, density from 0.910 to 0.925 g/cc) and linear low density polyethylene (LLDPE, density from 0.910 to 0.925 g/cc). (See ASTM D4976-98: Standard Specification for Polyethylene Plastic Molding and Extrusion Materials.) One of the main uses of polyethylene (HDPE, LLDPE, and LDPE) is in film applications, such as grocery sacks, institutional and consumer can liners, merchandise bags, multi-wall bag liners, produce bags, deli wrap, and shrink wrap. The key physical parameters of polyethylene film include tear strength, impact strength, tensile strength, stiffness and clarity. Tear strength is measured in machine direction (MD) and transverse direction (TD). Total tear strength (the product of MD tear and TD tear) is an indicator of overall tear properties. Critical processing properties on the film line include the output, bubble stability, gauge control (variability in film thickness), extruder pressure and temperature.

HDPE resins are used in a variety of high strength film applications such as grocery sacks, institutional and consumer can liners, and merchandise bags. Bags made from HDPE resins exhibit excellent tensile strength and stiffness compared to LLDPE and LDPE due to the higher density. Film grade HDPE used for high strength applications usually has a high molecular weight and a broad molecular weight distribution. In general, increasing the molecular weight of HDPE gives better physical properties of the film (tear properties and impact strength) and allows the film producers to reach thinner gauges. However, increasing the molecular weight results in higher extruder temperatures and pressures on a film line. Therefore, the molecular weight distribution of HMW HDPE film resins generally are broad to improve the processability on a film line and to lower the extruder pressures and temperatures. However, consumers often complain of the stiffness and noise associated with handling HDPE bags. This deficiency is related to the higher density of HDPE bags.

LLDPE and LDPE resins are also used in film applications because of outstanding tear properties due to lower density. However, LDPE and LLDPE bags suffer from low tensile properties. Therefore, LLDPE cannot be used in applications such as grocery sacks. Furthermore, LLDPE resins generally cannot be drawn down to thinner film gauges like the HMW HDPE resins.

HDPE is produced with two general classes of catalysts: the chromium oxide catalysts (see, e.g., U.S. Pat. No. 3,974,101) and Ziegler catalysts (Eur. Pat. No. 211,624). The chromium oxide catalysts produce HDPE having a broad molecular weight distribution (MWD) while the Ziegler catalysts produce narrow MWD HDPE.

LLDPE is produced by Ziegler catalysts or newly developed single-site catalysts. Single-site catalysts can be divided into metallocene and non-metallocene. Metallocene single-site catalysts are transition metal compounds that contain cyclopentadienyl (Cp) or Cp derivative ligands (see U.S. Pat. No. 4,542,199). Non-metallocene single-site catalysts contain ligands other than Cp but have the same catalytic characteristics as metallocenes. The non-metallocene single-site catalysts may contain heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) or quinolinyl (see U.S. Pat. No. 5,637,660). Single-site catalysts give LLDPE with narrower molecular distribution and more homogeneous comonomer distribution.

Multiple zone ethylene polymerization processes are also known. For example, U.S. Pat. No. 5,236,998 teaches a parallel multiple reactor process for producing a polyethylene using a Ziegler-Natta catalyst. Moreover, U.S. Pat. No. 4,357,448 teaches a two-step polymerization process to produce HDPE. The HDPE resins prepared by these patents have broad molecular weight distributions and improved processability. However, these resins are of densities within the range of typical HDPE.

Co-pending U.S. Appl. Ser. No. 09/302,059, filed Apr. 29, 1999, now U.S. Pat. No. 6,127,484, teaches a multiple reaction zone process that uses a single-site catalyst in a first reaction zone and a Ziegler catalyst in a later reaction zone. In the zone where a single-site catalyst is used, a low-density polyethylene is produced, while in the zone where a Ziegler catalyst is used, a high-density polyethylene is produced. Thus, the polyethylene resin produced has a relatively low density. The process, however, is complicated by using both single-site and Ziegler catalysts. Moreover, single-site catalysts are usually more expensive.

SUMMARY OF THE INVENTION

The invention is a high molecular weight, medium density polyethylene (HMW MDPE). The polyethylene comprises from about 85 to about 98 wt % of recurring units of ethylene and about 2 to about 15 wt % of a $C_3$–$C_{10}$ α-olefin. It has a density from about 0.92 to about 0.944 g/cc, a melt index $MI_2$ from about 0.01 to about 0.5 dg/min, and a melt flow ratio MFR from about 50 to about 300. It has a multimodal molecular weight distribution comprising a high molecular weight component and a low molecular weight component. The low molecular weight component is from about 35 to about 65 wt % of the polyethylene. The low molecular weight component has an $MI_2$ from about 50 to about 600 dg/min and a density from about 0.94 to about 0.97 g/cc. This unique composition gives the HMW MDPE performance that is superior to existing high density polyethylene (HDPE), linear low density polyethylene (LLDPE) and low density polyethylene (LDPE).

The invention includes a multiple zone ethylene polymerization process. The process uses a Ziegler catalyst and applies multiple reaction zones. The process comprises polymerizing an olefin mixture in a first reaction zone to produce a first polymer; removing some volatile materials, such as hydrogen, from the first polymer; and then continuing the polymerization in a second reaction zone to produce a second polymer. The first reaction zone uses a higher concentration of hydrogen than the second reaction zone. Thus, the first polymer has a lower molecular weight than the second polymer. More than two reaction zones can be used if desirable. The process of the invention further includes compounding the second polymer in the presence of oxygen.

DETAILED DESCRIPTION OF THE INVENTION

The high molecular weight, medium density polyethylene (HMW MDPE) of the invention comprises from about 85 to 98 wt % of recurring units of ethylene and from about 2 to about 15 wt % of recurring units of a $C_3$ to $C_{10}$ α-olefin. Preferably, the polyethylene comprises from about 90 to about 98 wt % of recurring units of ethylene and from about 2 to about 10 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene. The α-olefin comonomers form short-chain branches along the polyethylene backbones. The short chain branches separate the polyethylene backbones and thus lower the density of the polyethylene. The polyethylene of the invention has a density within the range of about 0.92 to about 0.944 g/cc. Preferably, the density is within the range of about 0.93 to about 0.944 g/cc.

The HMW MDPE of the invention has a high molecular weight and a broad molecular weight distribution. Molecular weight and molecular weight distribution can be measured by gel permeation chromatography (GPC). Alternatively, the molecular weight and molecular weight distribution can be indicated by melt indices. Melt index ($MI_2$) is usually used to measure the molecular weight and melt flow ratio (MFR) to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure. The polyethylene of the invention has an $MI_2$ from about 0.01 to about 0.5 dg/min, preferably from about 0.01 to about 0.3 dg/min, and an MFR preferably from about 50 to about 300. It has a relatively higher molecular weight and broader molecular weight distribution than the conventional HDPE and LLDPE.

The HMW MDPE of the invention has a multimodal molecular weight distribution. By "multimodal molecular weight distribution," we mean not only that the HMW MDPE has at least two different molecular weight components, but also that the two components differ chemically and structurally from each other. The lower molecular weight component has an $MI_2$ within the range of about 50 to about 600 dg/min, while the high molecular weight component has an $MI_2$ less than about 0.5 dg/min. The high molecular weight (low $MI_2$) component gives the polyethylene superior bubble stability in a blown film process and the low molecular weight (high $MI_2$) component gives the polyethylene excellent processability. Furthermore, the low molecular weight component has a density from about 0.94 to about 0.97 g/cc that is in the range of the conventional HDPE, while the high molecular weight component has a density from 0.90 to 0.94 g/cc, preferably from 0.91 to 0.94 g/cc, which is similar to the conventional LLDPE.

The invention includes films, sheets and pipes made from the HMW MDPE. Films are thinner than sheets. One advantage of the invention is that the HMW MDPE can be processed by conventional film equipment for LLDPE. The HMW MDPE is superior to existing HMW HDPE and LLDPE resins. For typical HMW HDPE resins, lowering the density may reduce the bubble stability while processing on a high stalk film line. In spite of the lower density, the HMW MDPE of the invention exhibits excellent bubble stability on a high stalk extrusion line due to the unique composition. These resins can be processed on either a high stalk film line or a conventional, in-the-pocket LLDPE film line. Another advantage of the HMW MDPE is its low melt viscosity, indicating better processability than LLDPE, even though the melt index is significantly lower.

Like the typical HDPE resins, the HMW MDPE of the invention exhibits the capability to be drawn down to thin gauges due to the high molecular weight and broad molecular weight distribution. The film exhibits superior total tear properties compared to conventional HDPE. With the lower density, the film made from the HMW MDPE feels softer than the conventional HDPE films. Yet the films have much better tensile strength than that produced from LLDPE resins, resulting in good handle and yield strength in bags. In thicker film gauges used in heavy duty shipping sacks, the HMW MDPE exhibits outstanding tear properties.

Methods for making polyethylene films are known. For example, U.S. Pat. No. 5,962,598, the teachings of which are herein incorporated by reference, teaches how to produce biaxially oriented films made in high stalk extrusion. In the process, polyethylene melt is fed by an extruder through a die gap (0.8 to 2 mm) in an annular die to produce a molten tube that is pushed vertically upward. At this point, the molten tube is approximately the same size as the annular die. Pressurized air is fed to the interior of the tube to increase the tube diameter to give a "bubble." The volume of air injected into the tube controls the size of the tube or the resulting blow-up ratio. In high stalk extrusion, the increase in the tube diameter occurs at a height of approximately 5–12 times the die diameter. This distance is referred to as the stalk or neck height. The expanded tube produces the desired biaxial orientation of the film that results in the balance of tear and impact properties of HMW HDPE resins. The tube is rapidly cooled by a cooling ring on the outside surface of the film. The bubble is collapsed between a pair of nip rollers and wound onto a film roll by the film winder. Collapsing of the tube is done after initial cooling at a point so that the wall surfaces will not adhere to one another. Mechanical strength of the film is defined in two directions, along the polymer flow exiting the die or machine direction (MD) and perpendicular to the polymer flow exiting the die or transverse direction (TD).

As the stalk height is decreased, the "bubble" sometimes may start to wobble in a side-to-side motion and/or up-and-down motion. This bubble instability will increase variability in the film thickness or gauge, leading to poor physical properties or requiring output to be reduced. Therefore, good bubble stability is essential in the production of film on a high stalk line. Bubble stability can be measured with the following test to give a numerical rating ranging from 1 to 52, where a rating of 52 represents the best bubble stability. The test is conducted on a HMW film line with a 75 mm extruder, fitted with a 160 mm die with a 1.5 mm die gap.

The test is divided into two parts. During the first part of testing, which is a measurement of melt strength, the resin is processed at different neck heights. The test begins at a neck height of 10 die diameters and a blow up ratio of 4:1 at an extrusion rate that gives a film that is 0.5 mils thick. In this part of the test, the bubble is lowered down to 6 die diameters at increments of one. Depending on the performance, points are awarded at each neck height (e.g., 10, 9, 8, 7, and 6 die diameters). All extrusion conditions remain constant during this part of the test. This score at each neck height depends upon the vertical bubble movement of the bubble or the number of inches of deviation of the bubble.

For example, if the bubble has less than one inch of vertical movement at 10 die diameters, then a numerical value of five is scored for the material and the test continues on to the lower neck height of nine die diameters and then continues to the subsequent lower neck heights. A lower numerical value is given to the material as the vertical deviation increases. At any given neck height, a one to two inches of deviation would be assigned a value of 4. A two to four inch deviation is scored three, a greater than four inch deviation is rated 2, and if the bubble breaks the material is given a rating of one and the test is complete. If a material can be processed at all neck heights with minimal variation, it is assigned a numerical value of twenty-five and the second stage of testing is begun. However, a material can have a lower rating than twenty-five and can be tested in the second stage. For example, it is possible that a material will have been rated to have a two to four inch movement deviation at the 6 die diameter neck height which would result in a lower rating than 25 but would allow the second part of the testing to be initiated.

The second part of testing is basically a test of the elasticity or the drawn down capability of the resin. At the 6 die diameter neck height, the winder is increased in 25-fpm increments starting at 250 fpm to 400 fpm. At 400 fpm the winder is increased in 50-fpm increments until 500 fpm is obtained. If less than three inches of movement is detected in the bubble, the material is assigned a numerical value of three. If the bubble deviation is greater than three inches the material is assigned a numerical value of two and if the bubble breaks, then it is assigned a numerical value of one and the test has been completed. The winder speed is increased until a bubble break is encountered or until 500 fpm winder speed is obtained.

The sum of the numerical values assigned to both parts of the test is the "BUBBLE STABILITY RATING" for that particular material. A rating of and above is considered good, indicating the resin can be processed on all types of film lines at full rates. A rating of 20 to 29 is fair and indicates that the resin can be processed on many film lines, but some processors may have issues. A rating below 20 is poor and indicates that many processors may have stability issues during processing and may not be able to process the resin at full rates.

The invention includes a multiple zone ethylene polymerization. The process includes polymerizing an olefin mixture in a first reaction zone to produce a first polymer that has a lower molecular weight and comprises about 35 to about 65 wt % of the total product; removing some volatile materials, such as hydrogen, from the first polymer; and then continuing the polymerization in a second reaction zone by adding more of the olefin mixture to produce a second polymer that has a higher molecular weight. The polymerization may be performed in more than two reaction zones if desirable.

The olefin mixture contains from about 85 to about 98 wt % of ethylene and from about 2 to about 15 wt % of a $C_3$ to $C_{10}$ α-olefin. Suitable α-olefins for use in the process are discussed above. Both reaction zones use a Ziegler catalyst. All of the required catalyst can be added in the first reaction zone and then carried over to the later reaction zone or zones. Alternatively, additional amount of catalyst can be provided in the later reaction zone or zones. Suitable Ziegler catalysts include titanium halides, titanium alkoxides, vanadium halides, and mixtures thereof. Examples are $TiCl_3$, $TiCl_4$, mixtures of $VOCl_3$ with $TiCl_4$, and mixtures of $VCl_4$ with $TiCl_4$.

The catalyst can be immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Preferably, the support has a surface area in the range of about 10 to about 700 $m^2/g$, a pore volume in the range of about 0.1 to about 4.0 mL/g, an average particle size in the range of about 10 to about 500 μm, and an average pore diameter in the range of about 10 to about 1000 Å. They are preferably modified by heat treatment, chemical modification, or both. For heat treatment, the support is preferably heated at a temperature from about 50° C. to about 800° C. Suitable chemical modifiers include organoaluminum, organosilicon, organomagnesium, and organoboron compounds.

The catalysts are supported using any known techniques. For example, U.S. Pat. No. 4,464,518, the teachings of which are herein incorporated by reference, teaches how to support $TiCl_4$ onto magnesium siloxide. In one suitable method, an alkyl magnesium halide reacts with a polysiloxane to form a magnesium siloxide; it is then used to support a titanium halide.

The catalyst is used with a cocatalyst. Suitable cocatalysts include trialkylaluminum compounds and dialkylaluminum halides. Examples are triethylaluminum, trimethylaluminum, and diethyl aluminum chloride. The cocatalysts are generally used in an amount from about 1 to about 100 moles per mole of catalyst.

The temperature for the first reaction zone is within the range of about 65 to about 110° C. Preferably, the temperature is within the range of about 75 to about 85° C. The temperature in the second reaction zone is within the range of about 60 to about 110° C., preferably about 75 to about 85° C. We have found that when the temperature of the second reaction zone is too low, it is difficult to incorporate the comonomer. Hydrogen is used to control the molecular weight in both reaction zones. The molar ratio of hydrogen to ethylene in the vapor space is from about 0.211 to about 10/1, preferably from about 1/1 to about 10/1 in the first reaction zone and from about 0.0005/1 to about 10/1, preferably from 0.0005/1 to about 5/1, and more preferably from about 0.0005/1 to about 0.8/1 in the second reaction zone. A higher concentration of hydrogen is used in the first reaction zone to give the first polymer a lower molecular weight or higher $MI_2$ than the second polymer. The first polymer has an $Ml_2$ from about 10 to about 600 dg/min, preferably from about 50 to about 600 dg/min and the second polymer has an $Ml_2$ from about 0.01 to about 100 dg/min, preferably from about 0.01 to about 5 dg/min, more preferably from about 0.01 to about 0.5 dg/min, and most preferably from about 0.01 to about 0.25 dg/min.

The process of the invention includes slurry, gas phase, and supercritical polymerizations. Slurry polymerization is preferred because it is easily controlled. Saturated aliphatic hydrocarbons are suitable solvents. It is desirable to use a solvent having a boiling point in the range of about 30° C. to about 110° C. Solvents of lower boiling point create high pressure in the reaction zones, while high boiling solvents are difficult to remove. Suitable solvents include isobutane, propane, pentane, hexane, heptane, octane, and cyclohexane, and mixtures thereof such as Isopar® G solvent (product of Exxon Chemical Company).

Alternatively, the polymerization conditions in the first reaction zone and the second reaction zone are reversed so that the first reaction zone produces a first polymer that has a higher molecular weight, while the second reaction zone produces a second polymer that has a lower molecular weight.

The process of the invention further includes compounding the second polymer in the presence of oxygen into a final product. Preferably, the oxygen concentration is about 5%. The compounding is preferably performed in an extruder or a mixer at a temperature from about 180 to about 300° C.

Polyethylene made by the process of the invention includes the HMW MDPE and HDPE. The HDPE made by the process has a high flow in an injection molding machine, while maintaining or improving the physical properties.

The following examples merely illustrate the invention. Those skilled in the art will recognize many variations that are within the spirit of the invention and scope of the claims.

EXAMPLE 1

A catalyst is prepared according to U.S. Pat. No. 4,464,518. The catalyst is dispersed in hexane to yield a catalyst slurry that contains about 1.4 wt % of solids. The catalyst slurry (0.059 parts per hour), triethyl aluminum cocatalyst (0.0033 parts per hour), hexane (41.0 parts per hour), 1-butene (0.37 parts per hour) and ethylene (16.9 parts per hour) are continuously fed into a first reactor. The reactor pressure is controlled at about 140 psig, the temperature at 82° C., and the molar ratio of hydrogen to ethylene in the vapor space at about 3.8 to give a first polymer. The first polymer has an $MI_2$ of 220 dg/min and a density of 0.953 g/cc.

The first polymer is transferred to a flash drum, where a portion of the volatile materials are removed. The mixture is then transferred to a second reactor. Hexane (42.9 parts per hour), 1-butene (1.23 parts per hour) and ethylene (18.6 parts per hour) are continuously fed into the second reactor. The reactor temperature is maintained at 77° C., and the molar ratio of hydrogen to ethylene in the vapor space at about 0.05 to give a second polymer that has an $MI_2$ of about 0.08 dg/min and a density of 0.936 g/cc.

The second polymer is isolated and dried under nitrogen. The dried powder is then compounded in the presence of 5% oxygen in the presence of a suitable stabilization package to give a polyethylene having an $MI_2$ of 0.054 dg/min, MFR of 145, and density of 0.938 g/cc.

The resulting polyethylene is converted into a film with a thickness of 0.5 mil on a HMW blown film line with a 60 mm grooved feed extruder at screw speed of 61 rpm. The extruder is equipped with a 120 mm mono layer die with a 1.2 mm die gap. The film is produced at a stalk height of six die diameters at a blow up ratio (BUR) of 4:1. The polyethylene film has excellent bubble stability and total tear strength as shown in Table 1.

The resulting polyethylene is converted into a film with a thickness of 4 mils on a HMW blown film line with three grooved feed extruders (50, 65, and 75 mm), feeding a 200 mm coex film die with a 1.5 mm die gap. The film is produced at 300 lbs/hr with a stalk of eight die diameters at a blow up ratio (BUR) of 4:1. The thick film has an excellent balance of total tear strength, dart (TEDD), tensile strength and modulus (stiffness) as shown in Table 2.

EXAMPLE 2

A catalyst is prepared generally according to U.S. Pat. Nos. 4,518,706 and 4,699,961. The catalyst is dispersed in hexane to yield catalyst slurry that contains about 0.03 wt % of solids. The catalyst slurry (5.0 parts per hour), triethyl aluminum cocatalyst (0.012 parts per hour), hexane (207 parts per hour), 1-butene (2.8 parts per hour) and ethylene (28.3 parts per hour) are continuously fed into a first reactor. The reactor pressure is controlled at about 140 psig, the temperature at 80° C., and the molar ratio of hydrogen to ethylene in the vapor space at about 2.6 to give a first polymer. The first polymer has an $MI_2$ of 110 dg/min and a density of 0.953 g/cc.

The first polymer is transferred to a flash drum, where a portion of the volatile materials are removed. The mixture is then transferred to a second reactor. Hexane (160 parts per hour), 1-butene (10.0 parts per hour) and ethylene (32.7 parts per hour) are continuously fed into the second reactor. The reactor temperature is maintained at 70° C., and the molar ratio of hydrogen to ethylene in the vapor space at about 0.025 to give a second polymer that has an $MI_2$ of 0.066 dg/min and a density of 0.935 g/cc.

The second polymer is isolated and dried under nitrogen. The dried powder is then compounded in the presence of 5% oxygen in the presence of a suitable stabilization package to give a polyethylene having an $MI_2$ of 0.047 dg/min, MFR of 149, and density of 0.936 g/cc.

The resulting polyethylene is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1. The resulting polyethylene has a bubble stability rating of 28 and excellent total tear strength as shown in Table 1.

EXAMPLE 3

A catalyst is prepared generally according to U.S. Pat. Nos. 4,518,706 and 4,699,961. The catalyst is dispersed in hexane to yield catalyst slurry that contains about 0.03 wt % of solids. The catalyst slurry (5.0 parts per hour), triethyl aluminum cocatalyst (0.012 parts per hour), hexane (176 parts per hour), 1-butene (2.6 parts per hour) and ethylene (28.7 parts per hour) are continuously fed into a first reactor. The reactor pressure is controlled at about 140 psig, the temperature at 80° C., and the molar ratio of hydrogen to ethylene in the vapor space at about 3.2 to give a first polymer. The first polymer has an $MI_2$ of 215 dg/min and a density of 0.954 g/cc.

The first polymer is transferred to a flash drum, where a portion of the volatile materials are removed. The mixture is then transferred to a second reactor. Hexane (201 parts per hour), 1-butene (9.1 parts per hour) and ethylene (32.7 parts per hour) are continuously fed into the second reactor. The reactor temperature is maintained at 70° C., and the molar ratio of hydrogen to ethylene in the vapor space at about 0.030 to give a second polymer that has an $MI_2$ of 0.083 dg/min and a density of 0.934 g/cc.

The second polymer is isolated and dried under nitrogen. The dried powder is then compounded in the presence of 5% oxygen in the presence of a suitable stabilization package to give a polyethylene having an $MI_2$ Of 0.061 dg/min, MFR of 145, and density of 0.934 g/cc.

The resulting polyethylene is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1.The resulting polyethylene has good bubble stability with a rating of 35 and excellent total tear strength as shown in Table 1.

EXAMPLE 4

A catalyst is prepared generally according to U.S. Pat. Nos. 4,518,706 and 4,699,961. The catalyst is dispersed in hexane to yield catalyst slurry that contains about 0.03 wt % of solids. The catalyst slurry (5.0 parts per hour), triethyl aluminum cocatalyst (0.012 parts per hour), hexane (154 parts per hour), 1-butene (4.6 parts per hour) and ethylene (29.3 parts per hour) are continuously fed into a first reactor. The reactor pressure is controlled at about 140 psig, the temperature at 80° C., and the molar ratio of hydrogen to ethylene in the vapor space at about 2.5 to give a first polymer. The first polymer has an $MI_2$ of 105 dg/min and a density of 0.953 g/cc.

The first polymer is transferred to a flash drum, where a portion of the volatile materials are removed. The mixture is then transferred to a second reactor. Hexane (172 parts per hour), 1-butene (6.8 parts per hour) and ethylene (32.5 parts per hour) are continuously fed into the second reactor. The reactor temperature is maintained at 70° C., and the molar ratio of hydrogen to ethylene in the vapor space at about 0.017 to give a second polymer that has an $Ml_2$ of 0.066 dg/min and a density of 0.933 g/cc.

The second polymer is isolated and dried under nitrogen. The dried powder is then compounded in the presence of 5% oxygen in the presence of a suitable stabilization package to give a polyethylene having an $MI_2$ of 0.039 dg/min, MFR of 183, and density of 0.934 g/cc.

The resulting polyethylene is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1.The resulting polyethylene has good bubble stability with a rating of 35 and excellent total tear strength as shown in Table 1.

EXAMPLE 5

A catalyst is prepared generally according to U.S. Pat. Nos. 4,518,706 and 4,699,961. The catalyst is dispersed in hexane to yield catalyst slurry that contains about 0.03 wt % of solids. The catalyst slurry (5.0 parts per hour), triethyl aluminum cocatalyst (0.012 parts per hour), hexane (154 parts per hour), 1-butene (2.5 parts per hour) and ethylene (29.4 parts per hour) are continuously fed into a first reactor. The reactor pressure is controlled at about 140 psig, the temperature at 80° C., and the molar ratio of hydrogen to ethylene in the vapor space at about 4.5 to give a first polymer. The first polymer has an $MI_2$ of 490 dg/min and a density of 0.955 g/cc.

The first polymer is transferred to a flash drum, where a portion of the volatile materials are removed. The mixture is then transferred to a second reactor. Hexane (172 parts per hour), 1-butene (5.9 parts per hour) and ethylene (32.7 parts per hour) are continuously fed into the second reactor. The reactor temperature is maintained at 70° C., and the molar ratio of hydrogen to ethylene in the vapor space at about 0.042 to give a second polymer that has an $MI_2$ of 0.085 dg/min and a density of 0.933 g/cc.

The second polymer is isolated and dried under nitrogen. The dried powder is then compounded in the presence of 5% oxygen in the presence of a suitable stabilization package to give a polyethylene having an $MI_2$ of 0.061 dg/min, MFR of 157, and density of 0.934 g/cc.

The resulting polyethylene is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1. The resulting polyethylene has excellent bubble stability with a rating of 41 and superb total tear strength as shown in Table 1.

Comparative Example 6

The procedure of Example 1 is repeated, but the reaction temperature in the second reactor is lower than in Example 1. The density values of the product from each reactor are also higher than in Example 1.

The catalyst slurry prepared in Example 1 is fed into the first reactor (about 0.20 parts per hour) with triethyl aluminum cocatalyst (0.0066 parts per hour), hexane (37.3 parts per hour, 1-butene (0.31 parts per hour), and ethylene (19.3 parts per hour). The reactor pressure is controlled at about 140 psig, the temperature at 82° C. and the molar ratio of hydrogen to ethylene in the vapor space at about 6.4 to give a first polymer having an $MI_2$ of 412 dg/min and a density of 0.962 g/cc.

The first polymer is transferred to a flash drum where a portion of the volatile materials are removed. The mixture is then transferred to a second reactor. Hexane (36.0 parts per hour), 1-butene (0.44 parts per hour) and ethylene (19.4 parts per hour) are continuously fed into the second reactor. The reactor temperature is maintained at 70° C. with a molar ratio of hydrogen to ethylene in the vapor space of 0.15 and a molar ratio of butene to ethylene of about 0.044 to give a second polymer. The second polymer has an $MI_2$ of 0.08 dg/min and a density of 0.948 g/cc.

The second polymer is isolated and dried under nitrogen. The dried powder is then compounded in the presence of 5% oxygen in the presence of a suitable stabilization package to give a polyethylene having an $MI_2$ of 0.055 dg/min, MFR of 153, and density of 0.949 g/cc.

The resulting polyethylene that is typical of a HMW bimodal film resin is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1.The film has very poor total tear strength compared to Example 1 as shown in Table 1.

The resulting polyethylene is converted into a film with a thickness of 4 mils on a HMW blown film line with three grooved feed extruders (50, 65, and 75 mm), feeding a 200 mm coex film die with a 1.5 mm die gap. The film is produced at 300 lbs/hr with a stalk of eight die diameters at a blow up ratio (BUR) of 4:1. The total tear strength is inferior to Example 1 as shown in Table 2.

Comparative Example 7

The procedure of Comparative Example 6 is repeated but the 1-butene concentration in the second reactor is increased to reduce the density. In the second reactor, the molar ratio of 1-butene to ethylene in the vapor space is 0.056 rather than 0.044 in Comparative Example 6. The density of the product out of the second reactor is 0.946 g/cc, which is lower than Comparative Example 6 (0.949 g/cc) but still higher than Example 1 (0.938 g/cc). The $MI_2$ of the compounded product is 0.07 dg/min.

The resulting polyethylene is converted into a film with a thickness of 0.5 mil on a HMW blown film line with a 65 mm grooved feed extruder at screw speed of 100 rpm. The extruder is equipped with a 160 mm mono layer die with a 1.5 mm die gap. The film is produced at a stalk height of eight die diameters at a blow up ratio (BUR) of 4:1. The film has a total tear strength of 628, which is better than Comparative Example 6 (492) but significantly lower than Examples 1–5 (ranging from 1019 to 1474).

Comparative Example 8

A LLDPE resin that is a typical hexene based LLDPE resin is converted into film with a thickness of 4 mils on a conventional film line with a 4 inch smooth bore extruder at 42 rpm. The extruder is equipped with a 6 inch mono layer die. The film is produced with no stalk height ("in the pocket") at a blow up ratio (BUR) of 4:1. The tensile, modulus and dart (TEDD) properties are inferior to Example 1 and Comparative Example 6 as shown in Table 2. The viscosity value at 100 1/sec of the Example 1 is lower than the LLDPE resin (Comparative Example 8), indicating that Example 1 processes easier on a film line.

TABLE 1

Summary of Physical Properties of Invention vs. HDPE at Thin Gauge (0.5 mils)

| Exam. No | 1 | 2 | 3 | 4 | 5 | C6 | C7 |
|---|---|---|---|---|---|---|---|
| 2nd Reactor Temp. ° C. | 77 | 70 | 70 | 70 | 70 | 70 | 70 |
| $MI_2$ in First Reactor, dg/min | 220 | 110 | 215 | 105 | 490 | 412 | 400 |
| Pellet $MI_2$, dg/min | 0.056 | 0.047 | 0.061 | 0.039 | 0.061 | 0.055 | 0.07 |
| Pellet Density, g/cc | 0.938 | 0.936 | 0.934 | 0.934 | 0.934 | 0.949 | 0.946 |
| MFR ($HLMI/MI_2$) | 145 | 149 | 145 | 183 | 157 | 153 | — |
| BUBBLE STABILITY RATING | 44 | 28 | 35 | 35 | 41 | 44 | 42 |
| MD TEAR*, g | 10.4 | 12.5 | 13.4 | 20 | 17.9 | 10.7 | 10.3 |
| TD TEAR**, g | 98 | 107 | 110 | 71 | 95 | 46 | 61 |
| TOTAL TEAR*** | 1019 | 1338 | 1474 | 1420 | 1701 | 492 | 628 |
| TEDD****, ft-lb | 1.9 | 2.3 | 2.4 | 2.4 | 1.7 | 1.8 | 1.8 |

*Machine direction tear strength.
**Transverse direction tear strength
***Total tear is product of MD tear and TD tear.
****TEDD is total energy dart drop.

TABLE 2

Summary of Physical Properties of Invention vs. LLDPE at Thick Gauge (4 Mils)

| Example No | 1 | C6 | C8 |
|---|---|---|---|
| FILM GAUGE (mils) | 4 mils | 4 mils | 4 mils |
| $MI_2$ (dg/min) | 0.056 | 0.055 | 1.0 |
| DENSITY (g/cc) | 0.938 | 0.949 | 0.918 |
| TENSILE STRENGTH AT YIELD, psi | 3030 | 3830** | 1530 |
| MD MODULUS, psi | 85,300 | 115,000 | 33,800 |
| TEDD, ft-lb | 610 | 570 | 500 |
| MD TEAR, g | 513 | 253 | 1968 |
| TD TEAR, g | 510 | 304 | 2352 |
| TOTAL TEAR, $g^2$ | 261,630 | 76,912 | 4,628,736 |
| VISCOSITY @100 $sec^{-1}$, poise* | 14,200 | 14,700 | 15,700 |

*Viscosity is measured at 190° C., using a Rosand capillary rheometer with Bagley and Rabinowitsch corrections applied to the data. Capillary dimensions are 1.00 mm diameter × 16 mm long and an orifice die 1.00 diameter × 0.220 mm long.
**Tensile strength for Example C6 is measured on film produced at stalk height of 6 die diameters.

We claim:

1. A multiple zone process which comprises:
    (a) polymerizing an olefin mixture that comprises:
        (i) from about 85 to about 98 wt % of ethylene; and
        (ii) from about 2 to about 15 wt % of a $C_3$ to $C_{10}$ α-olefin in a first reaction zone in the presence of a Ziegler catalyst at a hydrogen to ethylene molar ratio in the vapor space within the range of about 1/1 to about 10/1 at a temperature within the range of about 65° C. to about 110° C. to produce a first polymer that has an $MI_2$ within the range of about 50 to about 600 dg/min and density from about 0.94 to about 0.97 g/cc;
    (b) removing volatile materials from the first polymer; and
    (c) transferring the first polymer to a second reaction zone and continuing the polymerization in the second reaction zone by adding more of the olefin mixture at a temperature within the range of about 60° C. to about 110° C. at a hydrogen to ethylene molar ratio within the range of about 0.0005/1 to about 0.8/1 to produce a second polymer having a density within the range of about 0.92 to about 0.944 g/cc and an $MI_2$ within the range from 0.01 to about 0.5 dg/min;

wherein about 35 wt % to about 65 wt % of the total polymer is produced in the first reaction zone.

2. The process of claim 1 wherein the α-olefin is selected from the group consisting of propylene, 1-butene, 1-pentene, 1-hexene, 1-octene, 4-methyl-1-pentene, and mixtures thereof.

3. The process of claim 1 wherein the olefin is 1-butene.

4. The process of claim 1 wherein the polymerization is performed in a slurry phase.

5. The process of claim 1 wherein the polymerization is performed in a gas phase.

6. A multiple zone process which comprises:
    (a) polymerizing an olefin mixture that comprises:
        (i) from about 85 to about 98 wt % of ethylene; and
        (ii) from about 2 to about 15 wt % of a $C_3$ to $C_{10}$ α-olefin in a first reaction zone in the presence of a Ziegler catalyst at a temperature within the range of about 60° C. to about 110° C. at a hydrogen to ethylene molar ratio in the vapor space within the range of about 0.0005/1 to about 0.8/1 to produce a first polymer that has a density within the range of about 0.90 to about 0.944 g/cc and an $MI_2$ less than about 0.5 dg/min;
    (b) removing volatile materials from the first polymer; and
    (c) transferring the first polymer to a second reaction zone and continuing the polymerization in the second reaction zone by adding more of the olefin mixture at a hydrogen to ethylene molar ratio in the vapor space within the range of about 1/1 to about 10/1 at a temperature within the range of about 65° C. to about 110° C. to produce a second polymer having a density within the range of about 0.92 to about 0.944 g/cc and an $MI_2$ within the range of about 0.01 to about 0.5 dg/min;

wherein about 35 wt % to about 65 wt % of the total polymer is produced in the first reaction zone.

7. A multiple zone process which comprises:
    (a) polymerizing an olefin mixture that comprises:
        (i) from about 85 to about 98 wt % of ethylene; and
        (ii) from about 2 to about 15 wt % of a $C_3$ to $C_{10}$ α-olefin in a first reaction zone in the presence of a Ziegler catalyst at a hydrogen to ethylene molar ratio in the vapor space within the range of about 1/1 to about 10/1 at a temperature within the range of about 65° C. to about 110° C. to produce a first polymer having an $MI_2$ within the range of about 50 to about 600 dg/min and density within the range of about 0.94 to about 0.97 g/cc;

(b) removing volatile materials from the first polymer;

(c) transferring the first polymer to a second reaction zone and continuing the polymerization in the second reaction zone by adding more of the olefin mixture at a temperature within the range of about 60° C. to about 110° C. at a hydrogen to ethylene molar ratio in the vapor space within the range of about 0.0005/1 to about 0.8/1 to produce a second polymer having a density within the range of about 0.92 to about 0.944 g/cc and an $MI_2$ within the range of about 0.01 to about 0.5 dg/min; and (d) thermally processing the second polymer in the presence of oxygen into a final polymer.

8. The process of claim 7 wherein the α-olefin is selected from the group consisting of propylene, 1-butene, 1-pentene, 1-hexene, 1-octene, 4-methyl-1-pentene, and mixtures thereof.

9. The process of claim 7 wherein the α-olefin is 1-butene.

10. A multiple zone process which comprises:

(a) polymerizing an olefin mixture that comprises:
  (i) from about 90 to about 100 wt % of ethylene; and
  (ii) from 0 to about 10 wt % of a $C_3$ to $C_{10}$ alpha olefin in a first reaction zone in the presence of a Ziegler catalyst at a hydrogen to ethylene molar ratio in the vapor space within the range of about 0.2/1 to about 10/1 at a temperature within the range of about 65° C. to about 110° C. to produce a first polymer;

(b) removing volatile materials from the first polymer; and (c) transferring the first polymer to a second reaction zone and continuing the polymerization in the second reaction zone by adding more of the olefin mixture at a temperature within the range of about 60° C. to about 110° C. at a hydrogen to ethylene molar ratio within the range of about 0.05/1 to about 5/1 to produce a second polymer having a density lower than that of the first polymer and within the range of about 0.944 to about 0.965 g/cc and an $MI_2$ lower than that of the first polymer and within the range of about 2 to about 100 dg/min;

wherein about 35 to about 65 wt % of the total polymer is produced in the first reaction zone.

* * * * *